United States Patent [19]
Turner et al.

[11] 3,922,762
[45] Dec. 2, 1975

[54] AUTOMATIC POWER ADAPTER FOR MANUAL QUICK-RELEASE CONNECTORS

[75] Inventors: James W. Turner; Ray E. Spinks, both of El Centro, Calif.

[73] Assignee: The United States of America as represented by the Secretary of the Navy, Washington, D.C.

[22] Filed: Oct. 4, 1974

[21] Appl. No.: 512,823

[52] U.S. Cl. .................... 24/230 R; 244/151 A
[51] Int. Cl.² .................................... A44B 19/00
[58] Field of Search ........ 244/151 R, 151 A, 151 B, 244/122 B; 24/73 PH, 230 LP, 230 NP, 230 AL, 230 AM, 230 AV, 230 AP, 230 R, 230 AS, 230 AT, 230 AK, 230 AN, 230 A, 194; 294/83 R, 83 A, 83 AE, 83 AB; 280/150 SB

[56] References Cited
UNITED STATES PATENTS

| | | | |
|---|---|---|---|
| 3,183,568 | 5/1965 | Gaylord | 24/230 A |
| 3,624,813 | 11/1971 | Gaylord | 24/230 AV X |
| 3,632,066 | 1/1972 | Brown | 24/73 PH X |
| 3,656,211 | 4/1972 | Turner et al. | 24/194 X |
| 3,658,281 | 4/1972 | Gaylord | 244/151 A |
| 3,737,126 | 6/1973 | Martin | 244/151 B |
| 3,744,102 | 7/1973 | Gaylord | 244/151 A X |
| 3,744,103 | 7/1973 | Gaylord | 244/151 A X |

Primary Examiner—George E. A. Halvosa
Assistant Examiner—Galen L. Barefoot
Attorney, Agent, or Firm—R. S. Sciascia; G. J. Rubens

[57] ABSTRACT

A power-operated adapter particularly suitable for retrofitting existing coventional manually-operated parachute connectors, and being capable, when activated by a built-in power source, of automatically disconnecting the female and male connector halves to free the pilot from the parachute and of preventing reuse until the expended power source is replaced.

9 Claims, 5 Drawing Figures

AUTOMATIC POWER ADAPTER FOR MANUAL QUICK-RELEASE CONNECTORS

BACKGROUND OF THE INVENTION

This invention relates to release mechanisms, and more particularly to a power adapter designed primarily to provide an automatic power operation to manually-operated, quick-release connectors to free a pilot from his parachute, but it is understood that the invention can be used for any purpose for which it is found applicable. Pilots who are forced to eject over water are at times unconscious or injured to an extent that they are unable manually to operate the connector to release their parachute upon entering the water. Even though the pilot is uninjured at time of water entry, weather conditions such as high winds and/or strong undertow currents in the water can make it almost impossible for the pilot to reach the manually operated fittings to release the parachute. In addition, the pilot must perform this manual task twice in order to free his body from both sides of the chute. While attempting to perform these release operations, the pilot is in a precarious position of becoming entangled in the suspension lines rendering him incapable of remaining afloat.

SUMMARY OF THE INVENTION

An adapter for modifying manual quick-release connectors that provides an automatic power operation should the pilot be unable manually to operate the connector for any reason to free himself from the parachute upon landing. The power adaptor can be initiated by a water switch which is activated upon the entry of the pilot into the water.

The adapter is particularly designed to be capable of being readily incorporated in, and of modifying, standard manually-operated, quick-release connectors now in use and in stock such as is covered by U. S. Pat. Nos. 3,183,568 and 3,656,211. By retrofitting existing manually-operated connectors to provide an additional automatic operational feature, it is obvious that a substantial savings can be realized, as compared to constructing entirely new connectors having these capablities. It is obvious that the power adapter also can be incorporated in the manufacture of new connectors.

The adapter comprises a housing readily attachable to the existing female connector half adjacent an existing opening leading to the movable locking member. An anvil having a cam surface is adapted to engage a portion of the movable locking member, be it a pivotal shaft or a reciprocable bar, depending on the type of quick-disconnect connector employed. A piston driven by a power source abuts the anvil to actuate the movable locking member, which in turn unlocks the male member from the female member and permits separation of the connector.

STATEMENT OF THE OBJECTS OF THE INVENTION

A principal object of this invention is to provide an adapter capable of modifying existing manually-operable, quick-release connectors automatically to free a pilot from his parachute upon landing, especially when landing in water.

Another important object is to provide such a quick-release connector that is operable automatically in a positive manner, and with a high degree of reliability.

Still another important object is to provide an automatic adapter that can be attached to existing manual quick-release connectors with a minimal of modification to enable those connectors still in use or in stock to be retrofitted economically.

Further important objects are to provide an automatic attachment for a quick-release connector that is simple in operations; inexpensive in construction costs; that can be readily installed to permit replacement of the power source when expended; and as a safety feature will prevent relocking of the connector parts once activated unless a new power adapter is installed.

Other objects, advantages and novel features of the invention will become apparent from the following detailed description of the invention when considered in conjunction with the accompanying drawings.

DESCRIPTION OF THE PREFERRED EMBODIMENTS

Figure 1:
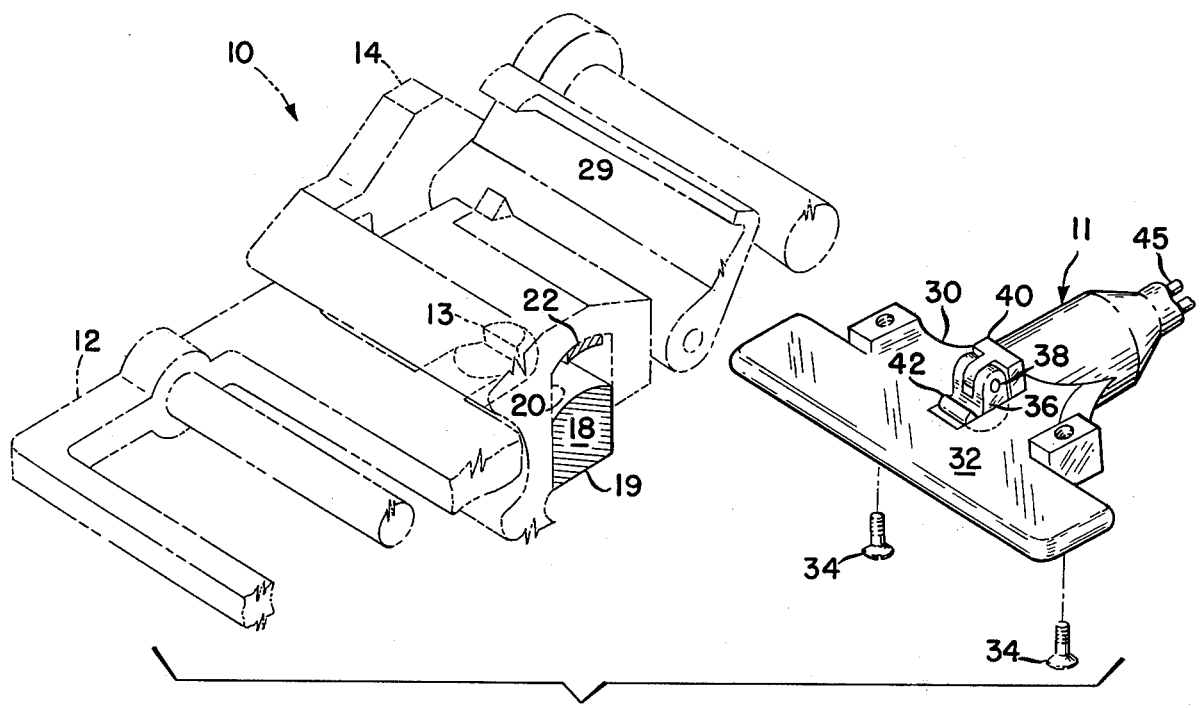
FIG. 1 is a perspective view, partially in section, of one type of a mechanical quick-release parachute connector in which is incorporated a power-actuated adapter of this invention.

Referring to the drawings where like reference numerals refer to similar parts throughout the figures, there is shown in FIG. 1 a perspective view of a quick-release connector 10 suitable for use in parachute harnesses. This connector is of the type shown in U.S. Pat. No. 3,656,211 issued to the inventors of subject patent application. The patented connector was originally designed to operate only by manual manipulation of the pilot. This invention is directed to a power-operated adapter 11 for modifying connector 10 in a simple and expedient manner to enable the connector to be either manually or power-operated. The power adapter can be retrofitted in existing connectors, or incorporated in the manufacture of such connectors.

As is fully described in U. S. Pat. No. 3,656,211 the connector comprises a male fitting 12 having a pair of spaced prongs 13 adapted to be mated with a female fitting 14. Prongs 13 have rounded ends provided with V-shaped notches 16 (FIG. 3) on their upper sides near their ends which are adapted to be engaged by two flanges 17 spaced between shoulders 19 on locking bar 18. Locking bar 18 is slidably mounted, transversely the prongs, in a vertical slot 20 formed in the female fitting. Slot 20 is open to the bottom said of the female fitting and is normally closed in the patented device by a cover plate (not shown), and which cover is replaced by adapter 11.

Locking bar 18 is biased to a downward locking position with respect to prongs 13 by a leaf spring 22 positioned in the space between the top of locking bar 18 and the top of slot 20. Locking bar 18 is movable to an upward release position by an actuating lever 24 readily accessible to the parachutist at the front of the connector. Actuating lever 24 is releasably secured in locked position by a locking lever 29. Both leg ends of actuating lever 24 are provided with cam surfaces engaging complementary cam surfaces on the bottom of locking bar 18, whereby locking bar can be manually raised against the action of spring 22 to release the prongs and enable the connector fittings to be separated.

Figure 2:
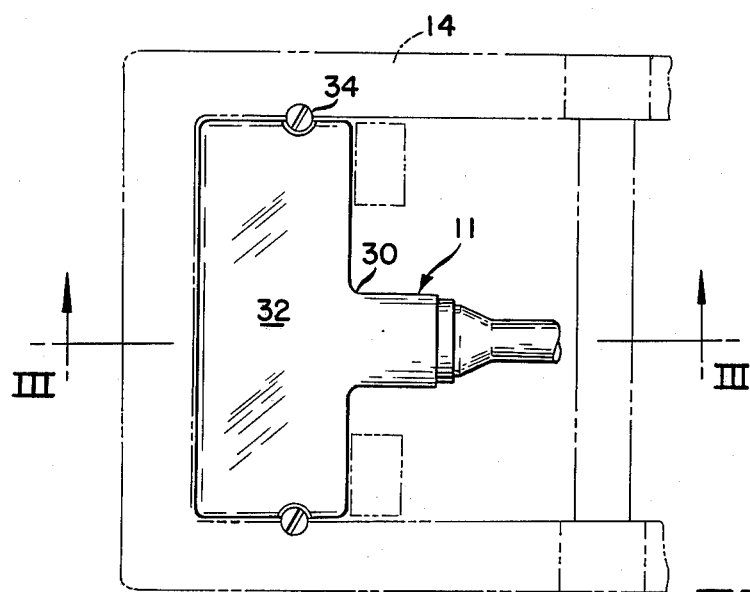
FIG. 2 is a bottom view of the parachute release connector of FIG. 1 with the adapter installed.
Figure 3:
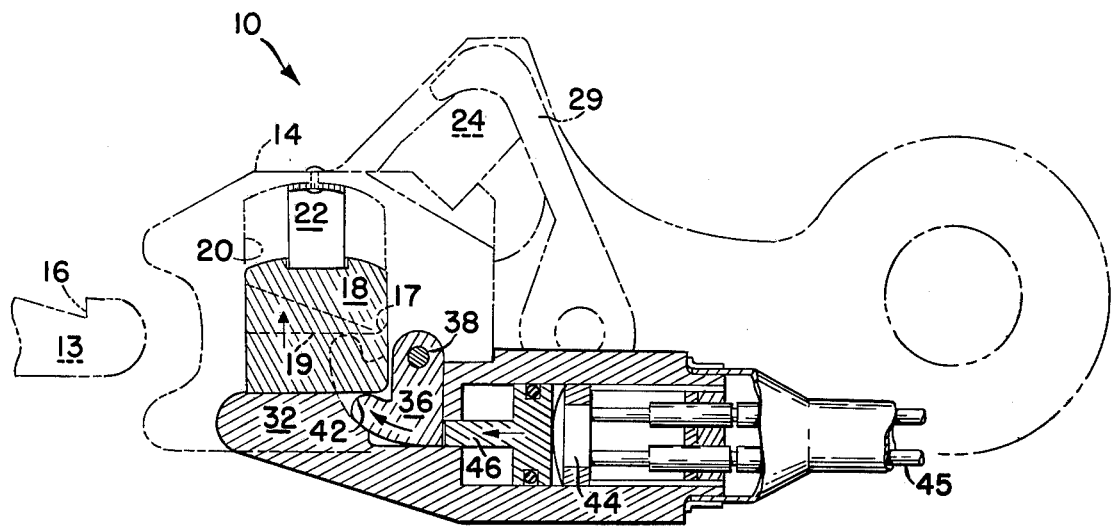
FIG. 3 is an enlarged partial cross-sectional view taken along lines III—III of FIG. 2.

By means of this invention, prior art manual connector 10 can be readily modified to have a power-operable mode to enable the connector to be automatically separated upon the entry of the parachutist in a body of water. As is best seen in FIGS. 1–3, power adapter housing 30 is T-shaped having a rectangular cross-piece portion 32 which closes bottom opening of slot 20, in lieu of the cover plate (not shown). The housing is secured to the female fitting by screws 34, which are the same screws that normally secure the discarded cover plate.

As best illustrated in FIGS. 1 and 3, an anvil 36 is pivoted at a bifurcated end by pin 38 to an integral raised shoulder 40 centrally located in the housing 30. Anvil 36 has a lip-shaped cam end 42 which is aligned, when the housing is mounted to the female fitting, to engage the underside of central shoulder 19 of locking bar 18. The anvil is actuated by an electrically-activated pyrotechnic charge 44, or its equivalent such as a source of gas pressure, which is mounted in housing 30. Charge 44 is provided with suitable shielded electrical cables 45 connected to a water-activated switch (not shown) or the like. Fluid pressure-generated by ignition of charge 44 drives a piston 46 to stirke anvil 36 at a side opposite the cam end 42, rotating the anvil upwardly to lift locking bar 18 to release prongs 13 from female fitting 14.

Another type of quick-release connector 48 currently used in Navy parachute harnesses employs a rocking shaft 58, in lieu of sliding locking bar 18, and is represented by U.S. Pat. Nos. 3,183,568 and 3,624,674 issued to J. A. Gaylord. This type of quick-release connector is disclosed in FIGS. 4 and 5 in this application wherein the novel power adapter 50 is attached thereto to enable this connector also to be power-actuated in addition to being manually-operable.

Figure 4:
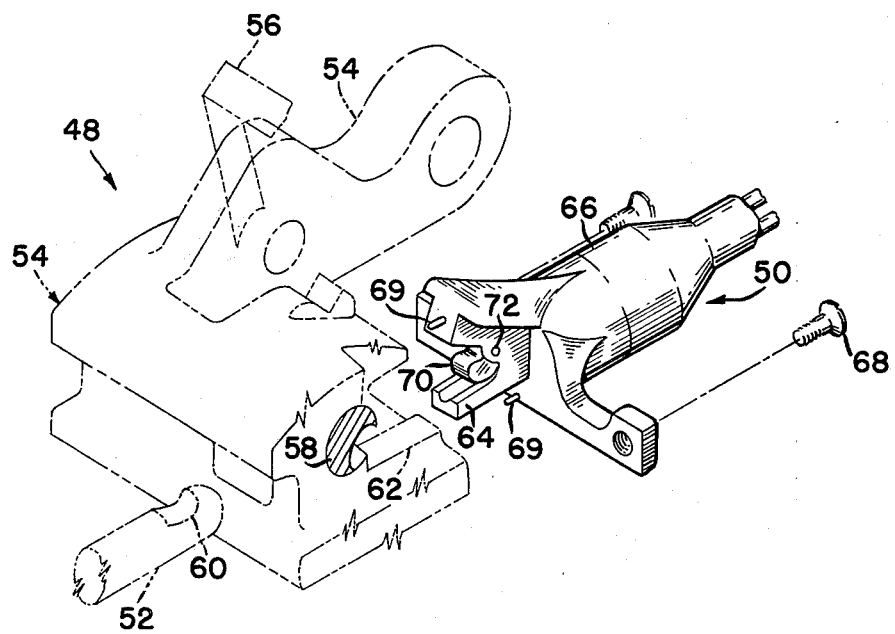
FIG. 4 is a perspective exploded view, partially in section, of another type of mechanical quick-release connector in which is incorporated a modified power-actuated adapter of this invention.

Quick-release connector 48 similarly comprises a male fitting, of which only one of the prongs 52 is illustrated in FIG. 4, and a female fitting 54, one-half being illustrated. By means of a yoke lever 56, a rocking shaft 58 in the female fitting is manually rotatable to disengage the shaft from a recess 60 in prong 52, to allow separation of the fittings.

Figure 5:
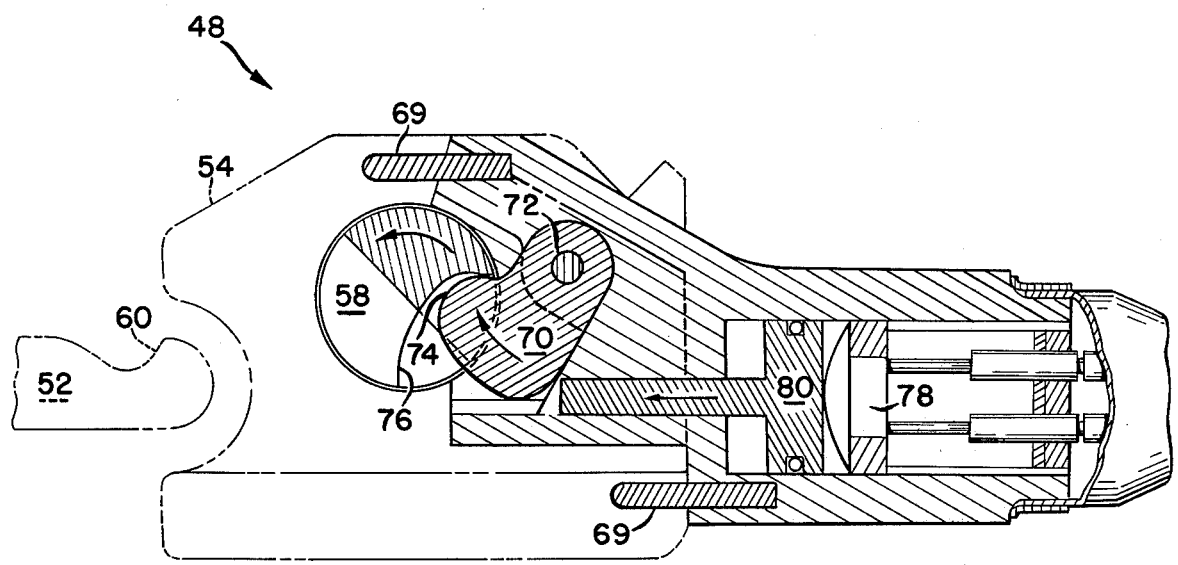
FIG. 5 is an enlarged partial longitudinal sectional view of the connector of FIG. 4.

Female fitting 54 is easily modified by milling off a shoulder at 62 on its base to receive an alignment extension 64 of the power adapter housing 66. Adatper housing 66 is secured to the female fitting by a pair of screws 68, pins 69 being provided for alignment purposes. An anvil 70 is pivotally mounted at one end centrally on adapter housing by a pin 72. As best shown in FIG. 5, anvil 70 has formed thereon a cam end 74 which is positioned to engage a cam recess 76 formed intermediately rocking shaft 58. Housing 66 encloses a pyrotechnic charge 78 or the like, and a piston 80, similar to that disclosed in the embodiment of FIGS. 1–3 and may be initiated by a water switch or the like. Piston 80 is aligned with an end of anvil 70 opposite cam 74, so that when charge 78 is activated, anvil 70 is rotated by piston 80, which in turn rotates rocking shaft 58 to disengage prong notches 60 and free the fittings. It should be noted that like the modification in FIGS. 1–3, once activated the anvil is locked in an open position by the piston which provides a safety feature to prevent reuse of the spent connector. To recharge connectors 10 and 48 the spent adapter is easily replaced with a new adapter, and the harnesses of which it is a part can be reissued for use.

The power actuator adapter of this invention can be readily attached to existing off-the-shelf, manually-operable, quick-release connectors to provide an additional automatic power mode, when necessary, or incorporated in new construction. The adapter is positioned on the underside of the conventional connector so as to be out of the way, and not interfere with normal manual manipulations of the connector by the parachutist. The adapter can be attached to the connectors requiring only a minimum of modifications, which makes it economically feasible to retrofit present connectors in use or in stock.

As a safety feature, once the pyrotechnic charge is activated to drive the anvil, the latter is locked in an open position by pistons 46 and 80. Therefore, the male fitting cannot be re-engaged with the female fitting until a new automatic power adapter is installed on the female fitting. Until fired, automatic adapters 11 and 50 do not interfere with manual operation of the connector by the user.

Obviously many modifications and variatons of the present invention are possible in the light of the above teachings. It is therefore to be understood that within the scope of the appended claims the invention may be practices otherwise than as specifically described.

What is claimed is:

1. A power adapter for attachment to a conventional, manually operable, quick-release connector having interconnectible male and female fittings, and a movable means extending transverse to said fittings for releasably locking said fittings together, said female fitting having an opening to which said movable means is accessible, and said adaptor comprising:
   a housing;
   means for mounting said housing to the female fitting adjacent said opening;
   said housing having a cylinder;
   a piston slidably mounted in the cylinder in a direction normal to said releasable locking means;
   a self contained power source supported by said housing for actuating said piston;
   an anvil pivotally mounted on said housing, said anvil having a cam surface for engaging said movable member, and a surface for engagement by said piston;
   whereby activation of said power source will drive the piston to pivot said anvil, which in turn will actuate the movable member to unlock said fittings.

2. The adapter of claim 1 wherein the piston has an extension that engages and jams the anvil to a locked position against the housing when actuated, preventing the fittings to be reconnected unless the expended power source is replaced.

3. The adapter of claim 1 wherein said female fitting has a U-shaped frame and the housing extends longitudinally between the legs of the frame.

4. The adapter of claim 1 wherein said movable means is a rocking shaft having a concave cam surface engageable by a convex cam surface on the anvil.

5. The adapter of claim 1 wherein the opening to said movable member of said female fitting is on the underside thereof, and said housing when attached substantially closes said opening.

6. The adapter of claim 5 wherein said movable means is a spring-biased rectilinearly movable bar in said opening, and said cam surface on the anvil engages the bottom of said bar to move same against the action of the spring to release the connector fittings.

7. The power adapter of claim 1 wherein said anvil upon activation by the power source locks the movable member in a released position preventing, as a safety measure, the connection of the male and female fitting until a new adapter is installed.

8. A quick-release connector comprising;
a female connector half fitting having at least one longitudinal opening to receive a prong on a male connector half;
a single elongate locking member supported on said female fitting and extending transversely to intersect said prong for releasably locking said male prong thereto;
manual lever means for actuating the locking member to release the prong;
means mounted on the female fitting for automatically actuating the locking member independently of said manual means;
said automatic actuating means comprising a housing;
means for attaching said housing to one side of said female fitting;
said housing supporting a cylinder, and a self-contained fluid power source connected thereto;
a piston slidably mounted in said cylinder and movable in a direction normal to said elongate locking means;
and cam means pivotally mounted on said housing and positioned between, and in direct contact with, said piston and said elongate locking means; and
means for preventing reuse of the connector until a spent power source is replaced;
whereby activation of said self-contained power source will drive the piston toward the elongate means to move the locking member through said cam means to release the male prong.

9. The connector of claim 8 wherein said piston is provided with an extension, and means are provided for locking said cam means in a power-actuated position to prevent reuse of the connector until the expended power source is replaced.

* * * * *